Jan. 5, 1954 J. E. COLLYER ET AL 2,665,375

RADIO TELEPHONE SYSTEM

Filed Sept. 9, 1949 4 Sheets-Sheet 1

INVENTORS
JOHN EDWARD COLLYER
ERIC PLAYFAIR FAIRBAIRN
BY [signature]
ATTORNEY

INVENTORS
JOHN EDWARD COLLYER,
ERIC PLAYFAIR FAIRBAIRN
BY [signature]
ATTORNEY

Jan. 5, 1954

J. E. COLLYER ET AL

RADIO TELEPHONE SYSTEM 2,665,375

Filed Sept. 9, 1949

4 Sheets-Sheet 3

INVENTORS
JOHN EDWARD COLLYER,
ERIC PLAYFAIR FAIRBAIRN
BY [signature]
ATTORNEY

INVENTORS
JOHN EDWARD COLLYER
ERIC PLAYFAIR FAIRBAIRN
BY [signature]
ATTORNEY

Patented Jan. 5, 1954 2,665,375

UNITED STATES PATENT OFFICE 2,665,375

RADIO TELEPHONE SYSTEM

John Edward Collyer, Coventry, and Eric Playfair Fairbairn, Copsewood, Coventry, England, assignors to The General Electric Company Limited, London, England Application September 9, 1949, Serial No. 114,754

Claims priority, application Great Britain September 9, 1948

5 Claims. (Cl. 250—6)

This invention relates to telephone systems in which subscribers are provided with normal telephone instruments and have means for establishing communication with other subscribers via radio links. The invention has for one of its objects to ensure that maximum use is made of the facilities provided by the radio links and that no radio links can be held by the telephone system when such holding is unnecessary.

Another object of the invention is the provision of means for giving break-in facilities for important telephone subscribers. Such facilities are known in connection with telephone systems, but their provision over a radio link involves additional difficulties in view of the different conditions inherent in the use of the said link instead of a telephone line. Further objects of the invention will be discernible in the following description of a system according to the invention.

This system is one in which several exchanges are provided, each exchange being connectable by radio links to one or more other exchanges. The system applies more particularly to an arrangement in which the said exchanges appear at intervals along a single path such, for example as at waystations along a railway, oil pipe or the like. Calls from one exchange may then be set up to any other exchange either directly or through one or more intermediate exchanges via radio links, each link interconnecting a pair of exchanges and being capable of bothway operation. To set up a call it is necessary to employ a selecting digit or digits at each exchange in order to distinguish thereat whether the call being set up is for that exchange or whether it is to proceed over a radio link. Such transmission is effected by providing one or more registers at each exchange, the register at the exchange originating a call attaching itself to the calling line and receiving the digits dialled by the calling subscriber. The register then proceeds to emit a train adapted to set up the call to the wanted subscriber via any intermediate exchanges or radio links required.

In view of the expensive nature of the radio links it is obvious that their number must be kept to a minimum and their holding time also reduced to the shortest possible on each established connection. Thus on a call which has been set up to a busy subscriber from a remote exchange all radio links employed in setting up the call are released if a busy condition is encountered. Similarly, if a call encounters an "all links busy" condition before the wanted subscriber is reached, all the radio links taken into use in partially setting up the call are released and the subscriber receives busy tone as before from his own exchange. These arrangements reduce unnecessary holding of the expensive radio links. From the point of view of circuit simplicity it is arranged that the release of the radio links takes place after the register has emitted all its digits and has disconnected itself from the connection. Once the subscriber has received busy tone he must hang up his receiver and re-start the connection by redialling since the register emits all digits dialled into it whether the call is successful or not, and thereafter cannot repeat the process.

Another feature of the invention is concerned with the provision of priority facilities for certain executives. The line circuits of these executives have a particular type of connection distinguishing them from ordinary subscribers, this connection ensuring that when a "subscriber busy" or "all links busy" condition is received, any connection including the radio links taken into use is held while the executive receives busy tone. The executive by now dialling an additional digit such as "1" may, if the connection has been established as far as the wanted subscriber's line, connect himself thereto and by speaking cause any other conversation not having priority to be interrupted. Alternatively he may connect his call in the case of an "all links busy" condition, to a pre-determined link already in use, and request the user to release the said link. The whole connection is then re-dialled by the executive.

A final feature of the invention is concerned with the allocation of the registers at each exchange. A common method of operation in register systems when a call appears on a particular line is for an allotter switch to cause a line finder and associated first selector to be connected to the said line. A hunting switch associated with the first selector then hunts for and connects a register to the calling line during the selecting period. In the system according to the invention the allotter switch is used for the dual purpose of causing the line finder to find the calling line and also to connect an idle register to the first selector. The allotter and, therefore, the register is released when selection is completed.

In order that the nature of the invention may now be more particularly described, reference will be made to the accompanying drawings in which.

Figures 2A, 2B:
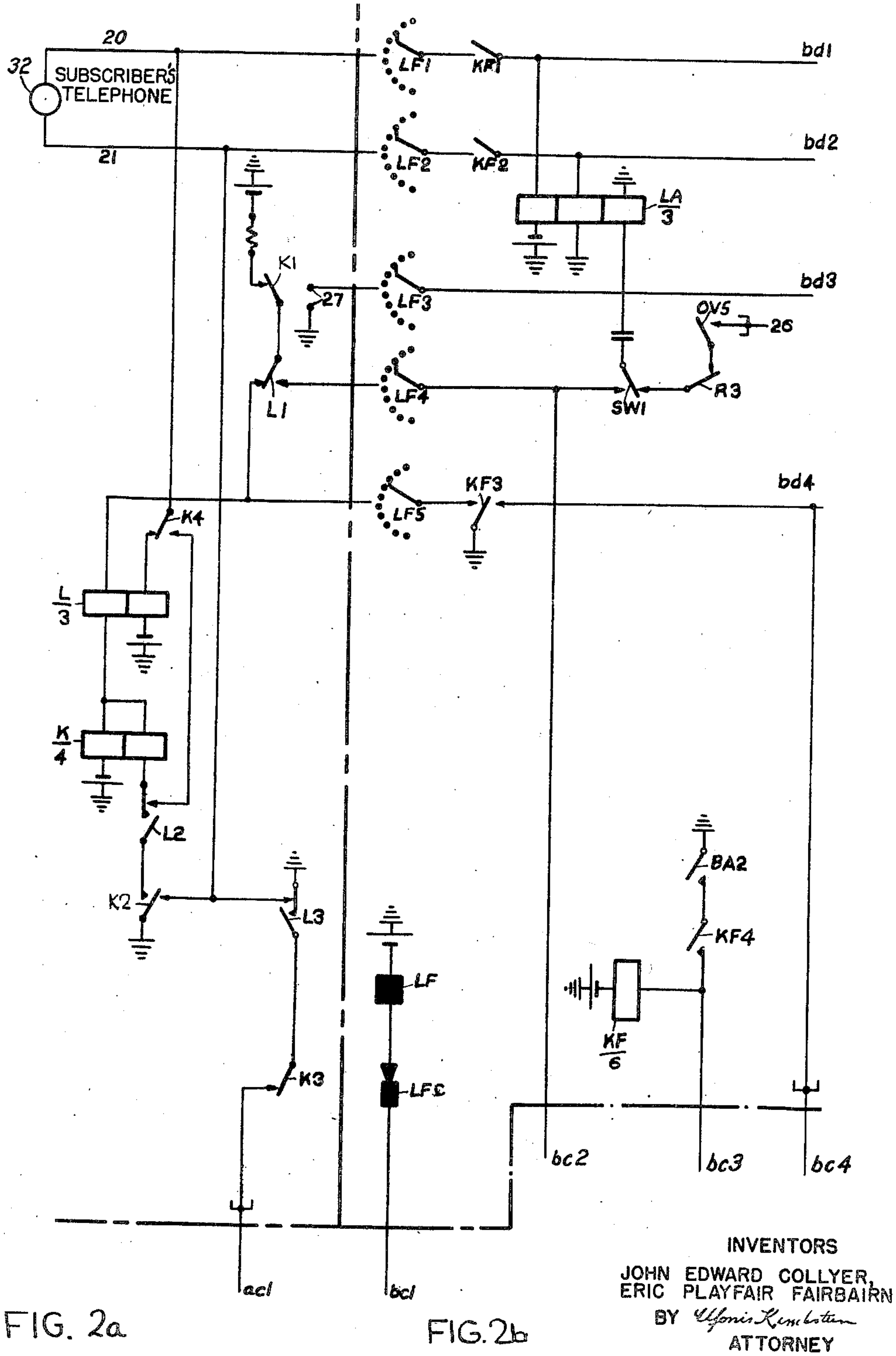
Figure 2*a* is a diagram of a subscriber's line circuit.
Figure 2C:
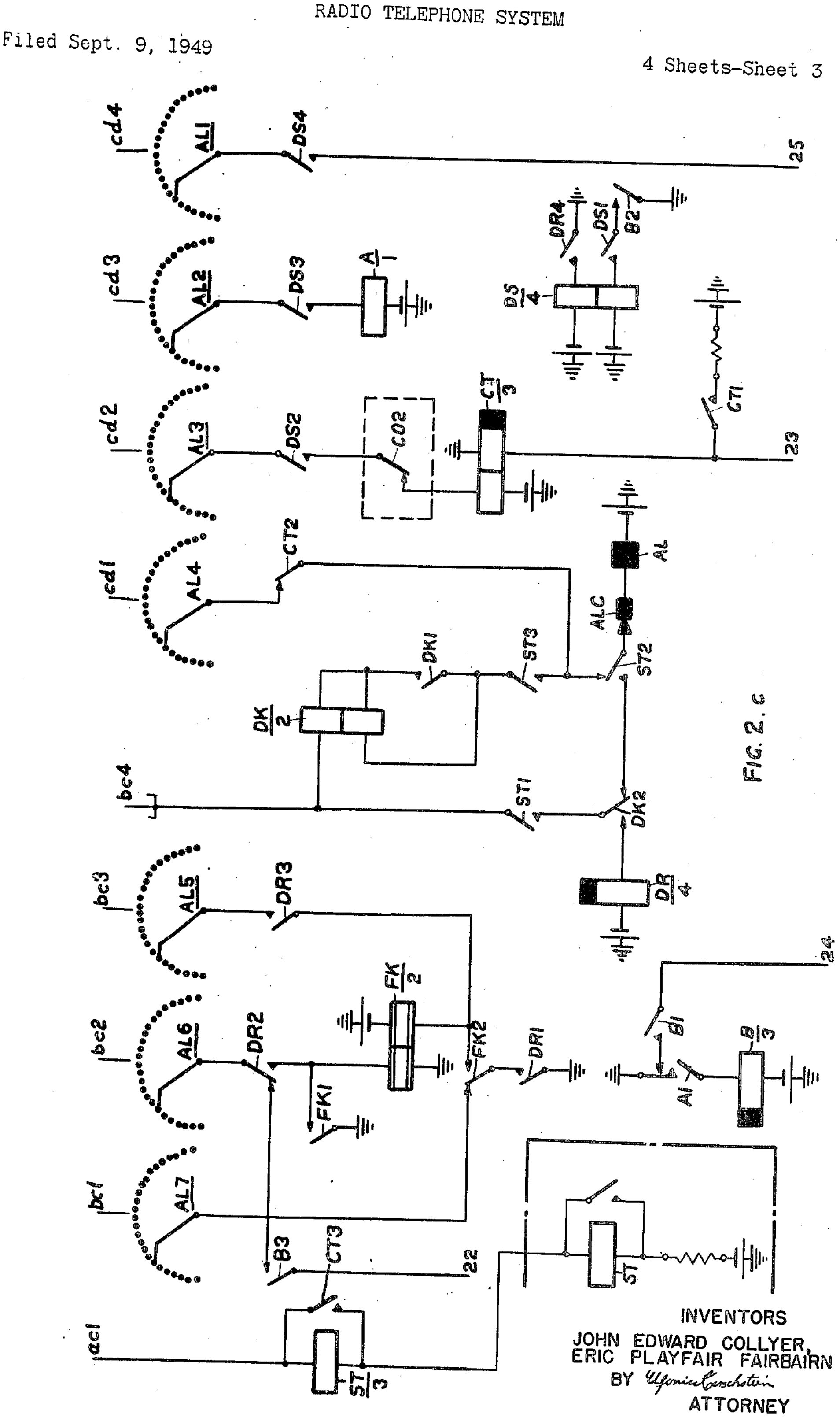
Figure 2 is a more detailed diagram of part of the apparatus used in the exchange shown in Figure 1; in particular

Figure 2*b* is a diagram of a line finder;

Figure 2*c* is a diagram of an allotter; and

Figure 2D:
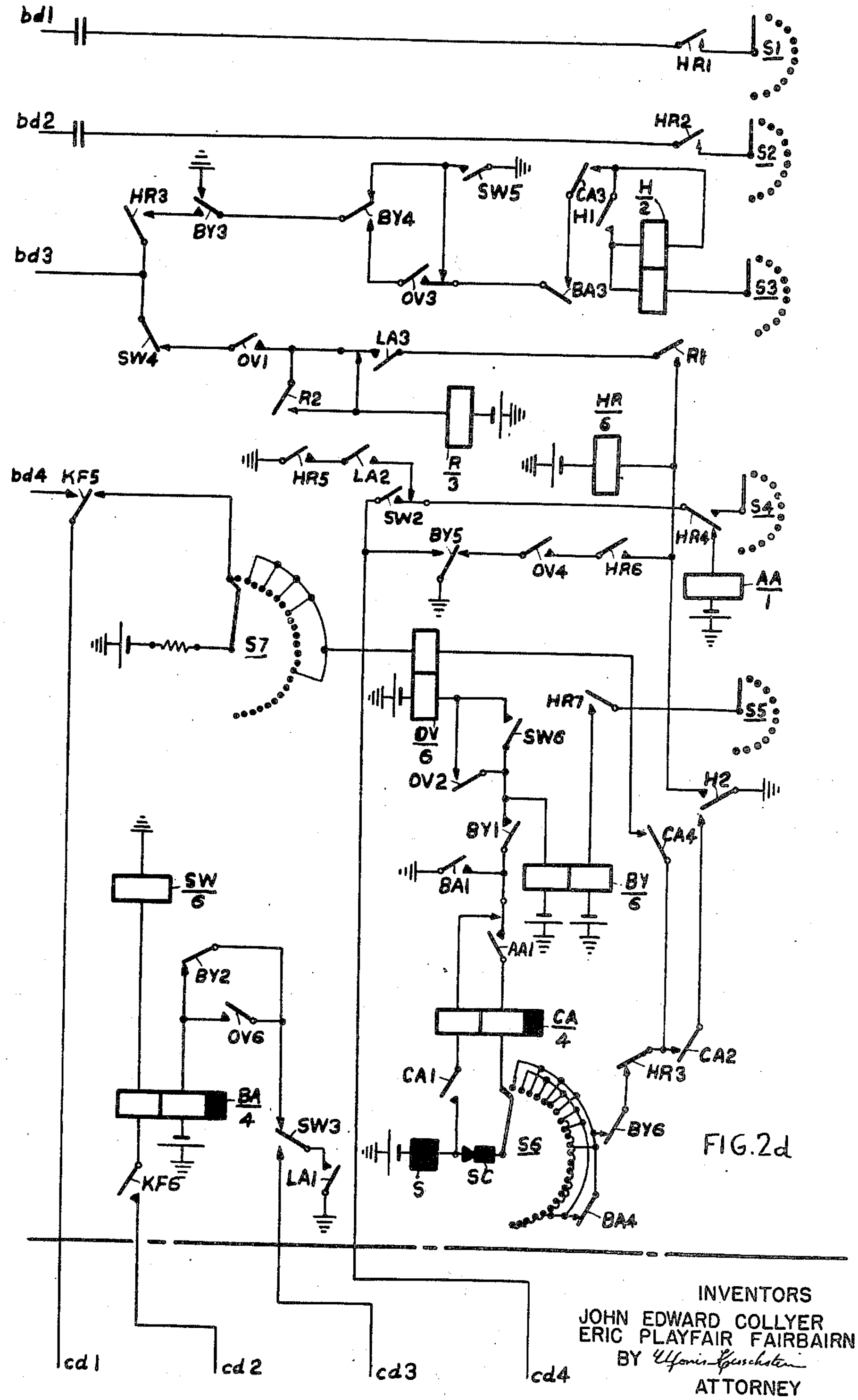

Figure 2*d* is a diagram of a first selector.

In the various parts of Figure 2, lines which are continuous between Figures 2*a*, 2*b* and 2*d* and Figure 2*c*, and between Figure 2*b* and Figure 2*d*, have been marked with corresponding reference numerals in the separate parts of Figure 2.

Figure 1:
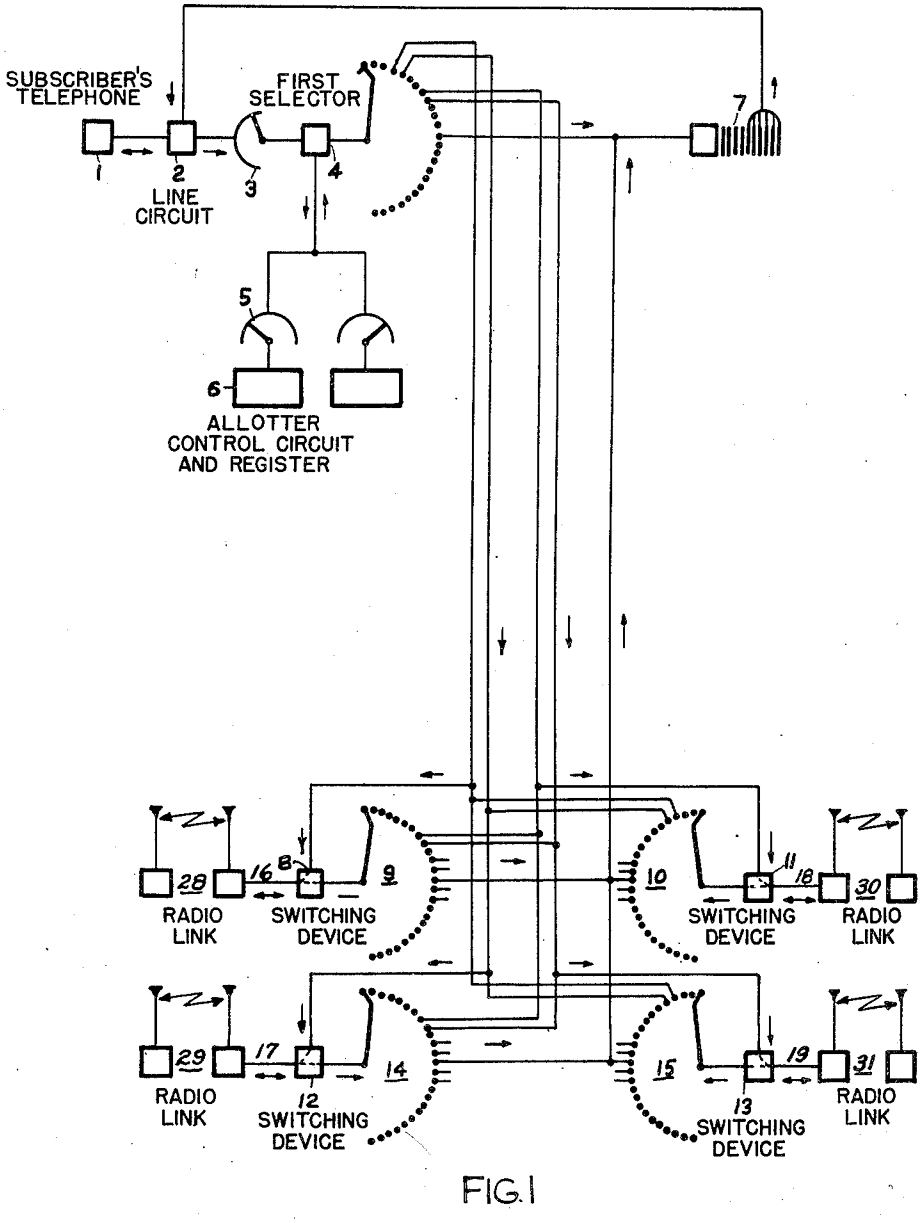
Figure 1 is a trunking diagram of a radio-equipped telephone exchange.

Referring to Figure 1, a subscriber's instrument 1 is connected via a wire line to a line circuit 2, a group of line circuits being accessible to a line finder 3. Each finder is associated directly with a particular first selector 4 and each line finder-selector combination is accessible to one of two allotters 5. Each allotter in turn is connected to its control circuit 6 with which a register for dialled numbers is combined.

The outlets in the bank of the selector 4 are of three kinds. A normal call from one subscriber to another in the same exchange progresses over a lead such as that shown from the selector 4 to the final selector 7, arrangements being such that in the scheme shown a three figure selection is effected. If a call to another exchange situated to the left of the figure is required, the selector 4 is positioned on the first of two trunks connected to the third and fourth contacts. These are connected to outgoing speech and digit repeaters 8 and 12, the repeaters 8 and 12 being connected to radio links 28 and 29 via links 16 and 17 respectively. The switch 4 hunts to find a free radio outlet. Again, if a call to an exchange situated to the right of the figure is required, the switch 4 is stepped to the seventh contact, this contact and the succeeding one being connected to switching devices 11 and 13, the devices 11 and 13 being connected via lines 18 and 19 respectively to two more radio links 30 and 31. Selection of a free link is automatic.

If a call arrives over a radio link 28 or 29 from the left hand side for a subscriber in the exchange shown, one of the switches 9 or 14, dependent on the link taken into use, is stepped to a contact similar to the twelfth contact shown from which a connection may be established to the final selector group 7, similar arrangements being made for calls arriving from the right hand side when switch 10 or 15 is employed. The arrows indicate the directions in which calls may be set up.

Finally, if a call from an exchange on the left is to be made for an exchange via a further radio link 30 or 31 on the right, switch 9 or 14 is stepped to the seventh or eighth contact from which connections are taken to switching device 11 or 13. Similar arrangements are made for calls being set up in the opposite direction.

It will be realised that a call between exchanges, since it uses a radio link, must not retain the link any longer than is necessary in view of the expense concerned in the provision and operation of the link. Thus when a busy condition is found it is arranged that all radio links taken into operation are released immediately if the call is being set up by an ordinary subscriber. If the originator is an executive the connection remains held although the executive receives busy tone. On receipt of this signal the executive may either release the call in the normal way, or by dialling a special signal may break into an established connection and issue instructions regarding freeing a radio junction. This and other facilities are described below in detail with reference to Figures 2*a* to 2*d*. Referring to Figures 2*a*, 2*b*, 2*c* and 2*d*, it is proposed to exemplify the operation of the circuits shown by setting up a call from one subscriber to another over various paths. The first is from a subscriber in the exchange shown to another subscriber in the same exchange.

The connections labelled 20 and 21 in Figure 2*a* are connected to a subscriber's telephone instrument 32 via an ordinary wire line. The subscriber lifts his receiver, and a loop is placed across the line wires causing operation of relay L from battery via K4, line loop to earth on K2.

L1 applies a battery to mark the line from K1, in the bank LF4 of the line finder.

L3 applies earth via K3 to a start circuit for the allotter, operating relay ST. One of these relays is provided for each allotter-register circuit, arrangements being such that if one of these apparatus groups becomes busy, its ST relay is short-circuited so that the start signal is not effective. Assuming relay ST operates, ST1 and ST2 connect the allotter switch magnet AL via its interrupter contact ALC via a common lead to earth on KF3. Earth is always present on this lead if a free finder is available. The switch commences to step its wipers by self-interruption over its bank contacts.

It should be noted that if both allotter circuits are free, both ST relays operate so that both allotter switches start stepping simultaneously. Both allotters find free finders if available, and both finders start to look for the calling line. The first finder to find the line removes the start signal and thus causes all the hunting switches to stop.

The allotter continues to step by self-interruption until wiper AL4 encounters battery via KF5 and S7. Relay DK now operates via ST3 to earth on KF3.

DK1 makes relay DK slightly slow to release by short circuiting one coil.

DK2 cuts the hunting circuit for the magnet AL and operates relay DR.

DR1 applies earth via FK2 and AL7 to the line finder magnet LF which steps by self-interruption via its contact LFC to find the calling line.

DR2 and DR3 connect the relay FK to the line finder.

DR4 operates relay DS.

DS1 prepares to lock the relay operated later.

DS2, 3 and 4 connect the allotter to the first selector associated with the found line finder.

When the line finder finds the calling line relay FK operates to battery via DR2, AL6, LF4, L1 and K1.

FK1 applies earth to the operating lead, engaging the finder and the line.

FK2 cuts the stepping circuit for magnet LF and holds relay FK operated. This earth also operates relay KF.

KF1 and KF2 switch the calling line through to relay LA which operates.

KF3 applies earth to the subscriber's P wire and operates relay K whilst holding relay L in series. It also releases relays DR and DK slowly.

KF4 prepares to hold relay KF locked operated.

KF5 removes operating battery potential from relay DK.

KF6 operates relays SW, BA and CT over the path AL3, DS2 and CO2. This latter contact is in the register, which is not shown.

K1 disconnects starting battery potential from the P wire.

K2 disconnects calling earth from the subscriber's line.

K3 disconnects the start circuit and releases relay ST.

K4 disconnects the battery-connected coil of relay L from the subscriber's line.

LA1 operates relay A via SW3, AL2 and DS3.

LA2 and LA3 perform no functions at the moment.

SW1 applies dial tone from the line 22 to the calling line via B3, DR2, AL6 and one coil of relay LA.

SW2 prepares an impulsing path for use later.

SW5 prepares to operate relay H later.

BA1 provides a holding potential for use later.

BA2 locks relay KF operated.

CT1 holds relay CT operated until released later by earth applied to the lead 23. This and the other leads 24 and 25 are connected to the register portion of the register-allotter. As the register is of known character, its function being to receive a given number of dialled digits, translate them into another set of digits and transmit the digits, and since it forms no part of the present invention, it is not shown in detail.

CT3 short-circuits the ST relay associated with it, preventing this relay from operating and restarting the allotter during impulse storage and retransmission.

A1 operates relay B.

B1 prepares to transmit impulses to the register from A1 via lead 24.

The subscriber now proceeds to dial a set of digits into the register. During this process relay LA releases and re-operates, its contact LA1 causing relay A to perform similar actions. Contact A1 communicates the digits to the register over lead 24 whilst holding relay B operated. At an appropriate point in the operation a contact in the register closes and applies earth to lead 25, the translated digits arriving later on this lead. Application of earth to this lead operates relay AA via DS4, AL1, SW2 and HR4. The first closure of AA1 operates relay CA from BA1 via S3 and SC, but as CA is high resistance, magnet S is not operated. On the first break of earth from lead 25 relay AA releases.

AA1 operates magnet S via the second coil of CA, which is low resistance, and CA1.

CA2 breaks a hunting path.

CA3 prevents premature operation of relay H.

CA4 prevents premature operation of relay OV.

At the end of the first impulse relay AA re-operates and the switch S steps its wipers one contact forward. This continues until the end of the first translated digit, relay CA being held operated in series with the switch magnet. At the end of the digit relay AA remains operated and CA releases slowly. The wipers of the switch are now positioned at the beginning of a group of contacts connected to final selectors in the same exchange. A hunting action takes place from earth on H2 via CA2, BY6, S3 and interrupter contacts SC until a free final selector is found. The final selectors are of substantially normal construction and operation and are, therefore not described in this specification. When a free selector is found, battery potential occurring on the appropriate contact in bank S3 operates relay H to earth on SW5 via CA3 and BA3.

H1 short circuits a high resistance coil of relay H and applies its operating earth to the P wire of the chosen final selector, engaging the switch.

H2 cuts the hunting circuit of switch S and operates relay HR.

HR1 and HR2 connect the subscriber to the chosen final selector via S1 and S2.

HR4 disconnects relay AA which releases and connects lead 25 via SW2 to bank S4 and hence to the impulsing relay of the final selector.

HR6 holds relay HR operated to earth on BY5 on a subsequent condition.

HR7 prepares to operate the busy relay BY if the called subscriber is engaged.

Further impulses generated by the register are now communicated to the final selector and position its wipers on the line of the wanted subscriber. At the end of impulsing contacts CO2, which are in the register circuit, open. In addition, earth is placed on lead 23 so that relays CT and SW release. The holding circuit of relay BA is transferred to LA1 and SW3 via BY2 or OV3. The effect of these switching operations is to release the register and allotter for use on a subsequent call, the register being arranged to send out all its stored digits, no matter whether a busy condition is encountered during transmission or not. Relay A is released by SW3, followed later by relay B and hence relay DS. The register and allotter are now completely disconnected from the engaged first and final selectors.

If the called subscriber is free no further operations in the circuit shown takes place. At the conclusion of the call the break on the subscriber's line circuit which occurs when he hangs up, releases relay LA. This is followed by relay BA and by the relays H and HR. All the contacts except the first in bank S6 are now connected together to earth on H2 so that the switch returns to a home position and is then ready to receive further impulses. The line finder LF is non-homing.

A number of busy conditions may, however, be encountered. The first one is that all the final selectors are in use. Under this condition switch S steps by self-interruption until it reaches the end of the contacts connected to final selectors. On the last contact, battery from S7 operates relay OV via CA4, CA2 and H2. As the earth connection from H2 via CA2, HR3 and BY6 to bank S6 stops one short of the end of the group of contacts connected to final selectors the switch wipers remain on the contacts connected to the last final selector.

OV1 prepares to operate relay R.

OV4 prepares to hold relay HR from BY5.

OV5 supplies busy tone from the line 26 to the caller via R3, SW1 and one coil of relay LA.

OV6 prepares to hold relay BA operated.

If the subscriber making the call has ordinary facilities he can now do no more than restore his receiver to release the call, and try again later. If the subscriber has priority facilities, a connection extends between two terminals 27 connected to bank LF3 so that an earth potential exists on its wiper. If a subscriber having this priority receives busy tone he may either release the call or dial the digit "one." In the latter case release of contact LA3 operates relay R from earth on LF3 via SW4 and OV1. R2 holds relay R operated to this earth. R3 disconnects busy tone.

Re-operating of relay LA at the end of the digit extends earth from LF3 forward via R1 to operate relay HR. The contacts HR1 and HR2 of this relay connect the caller's line to the connection established via the last final selector. The subscriber having priority may now issue instructions as to the release of this connection, when he may release his own connection and re-dial knowing that a free final selector exists.

The second busy condition is that of an engaged subscriber. When the last of the translated digits is sent into the final selector, the allotter and register release as previously described. During the release time of a relay in the final selector a test is made, and if the subscriber is busy, earth is returned over wiper S5 to operate relay BY.

BY1 operates relay OV during the release time of relay SW.

BY3 removes earth for holding relay H operated unless the caller has priority (see later).

If the caller has no priority, no earth exists on wipers LF3 so that relay H releases followed by relay HR. This releases the final selector, and contact HR5 prevents any further impulsing by contact LA2 from influencing the final selector.

If, however, the caller has priority, earth exists on wiper LF3 so that relay H remains held operated via HR3, BY3, BY4, OV3, BA3 and CA3. The caller can now dial an extra digit, whereupon relay R is operated by LA3 as previously described. Since busy tone is removed by R3 the caller can now speak to the established connection and issue instructions as regards its clear-down. He then replaces his own receiver and re-dials the connection. It should be noted that in addition to the operation of relay R, contact LA2 provides a pulse to the final selector via bank S3, this pulse being arranged to operate the switching relay therein, similar to the HR relay in Figure 2*d*, this being for the purpose of enabling the caller to speak to the established busy connection.

The main function of these switching arrangements is, however, in connection with the use of the radio links between the exchanges. It will be seen from Figure 1 that the switch 4 may either be stepped to a final selector such as 7 or it may connect the caller to any of the radio links 28, 29, 30 or 31 via the switching devices 8, 11, 12 or 13. These devices, in addition to the usual line balances and so on contain also switching circuits similar to those provided in the first and final selectors, sufficient of each of these circuits being fitted to provide the necessary switching operations. Thus, if a caller dials a number into the register which positions the wipers of S6 (Figure 2*d*) on to outlets to a radio link, a switching device such as 8 or 9 is seized, causing emission of carrier over the link in both directions. Subsequent impulses, signals and speech are repeated over the link by the switching devices such as 8, the link being employed as though it were a straight-forward two-way connection. Receipt of a busy condition at any stage in setting-up the call causes the switching device 8 to function as though it were a final selector positioned on a busy subscriber. Under these conditions switching similar to that already described above takes place. If the caller has no priority, all the links and switching devices taken into operation are released. If, however, the subscriber has priority all radio links up to the busy condition are held, and the dialling of the additional digit "one" by the caller establishes connection from his line to the final one of the group of radio links in which the busy condition occurs. Instructions as to clearing the link may then be issued by the caller, the connection established is released and the whole of the digits are re-dialled and re-transmitted. A similar process occurs if connection to a busy subscriber via a radio link has been made, all links and apparatus being held if the subscriber has priority.

From Figure 1 it will be seen that in addition to acting as a local exchange the apparatus thereat may be employed to pass a call via the exchange from one radio link to another. Under these conditions the same kind of switching facilities are employed in connection with the switching devices 8, 11, 12 or 13. These devices may repeat impulses, tones and speech from one line to another without traversing the local first and final selectors. It will thus be seen that busy switching arrangements provided at each exchange in connection with its own calls are also available to calls sent over the radio links, the caller being unaware other than from the initially dialled digits, that a radio link is employed.

If a subscriber wishes to make a call via a radio link he dials a number which causes the engaged first selector to test, say, the third and fourth contacts for a free link. If none exists, busy switching conditions are as for an "all final selectors busy" condition. The first selector stops on the second of the two links and returns busy tone to the caller. If he has priority he may dial "1" and break in on the radio link as previously described for a busy final selector, and give orders as to freeing the link. The priority call is then re-dialled.

Similarly if a call is to be established over a radio link from a subscriber at one exchange to a subscriber at another, the latter subscriber may be found busy. Tone is then transmitted back from the last exchange over the link to the first, where the switching device associated with the link translates the tone into a potential to operate relay BY. A priority signal, if made, is transmitted forward over the link as an ordinary impulse, to operate priority switching arrangements in the final selector at the last exchange. Such busy and priority signals may be transmitted over several radio links in series if required, the caller being enabled to break in on a busy condition whenever encountered.

We claim:

1. A telephone system in which calls are set up between subscribers connected to different exchanges via radio links used as bothway junctions and in which certain subscribers have priority facilities, comprising means for releasing at any stage in the setting up of a call all the radio links already employed in the setting up of the call, means for operating the releasing means operable in response to a busy condition encountered at any stage in the setting up of a call from an ordinary subscriber, means for preventing the operation of the releasing means if a busy condition is encountered at any stage in the setting up of a call from a priority subscriber, means for transmitting to the priority subscriber an indication that a busy condition has been encountered, and means operable by the priority subscriber after he has received such an indication for connecting the priority subscriber to a subscriber whose call is causing the busy condition.

2. A telephone system according to claim 1, comprising means for maintaining a point in the priority subscriber's line circuit at a fixed potential, and means for preventing the operation of the releasing means, said means for preventing the operation of the releasing means being operable by virtue of the maintenance of said point at the fixed potential.

3. A telephone system according to claim 2, in which said means operable by the priority subscriber comprises dialling means for transmitting a signal, means for connecting the priority subscriber to an already established connection, and means for applying a signal transmitted from the dialling means to the means for connecting the priority subscriber to an already established connection, the last-mentioned means being operable in response to the application of such a signal by virtue of the maintenance of said point at the fixed potential.

4. A telephone system according to claim 2 comprising means operable by a subscriber originating a call for dialling a series of digits, a combined allotter-register at the exchange to which the calling subscriber is connected, and means for applying to said allotter-register a series of digits dialled by the means operable by the calling subscriber, said allotter-register comprising register means for storing and translating said series of digits and emitting a resultant route and subscriber calling code corresponding to said series of digits, and allotter means acting as a line-finder allotter.

5. A telephone system according to claim 4, comprising a first selector at the exchange to which the calling subscriber is connected, final selectors at the same exchange, switching devices connected with the radio links by which a call from the exchange is set up, outlets from said first selector to both said final selectors and said switching devices, means operable by said allotter means for connecting said first selector to said register means, means for applying a translated digit from said register means to said first selector, and means for connecting the calling subscriber's line to an appropriate outlet according to the nature of said translated digit.

JOHN EDWARD COLLYER.
ERIC PLAYFAIR FAIRBAIRN.

References Cited in the file of this patent

UNITED STATES PATENTS

| Number | Name | Date |
|---|---|---|
| 1,212,908 | Cooley | Jan. 16, 1917 |
| 1,710,182 | Nelson | Apr. 23, 1929 |
| 1,723,209 | Ruggles | Aug. 6, 1929 |
| 2,061,699 | Fox | Nov. 24, 1936 |
| 2,137,023 | Monk | Nov. 15, 1938 |
| 2,292,222 | Haigis | Aug. 4, 1942 |
| 2,377,453 | Rhoads | June 5, 1945 |
| 2,377,544 | Durkin | June 5, 1945 |
| 2,421,017 | Deloraine et al. | May 27, 1947 |